United States Patent
Klemm et al.

(10) Patent No.: US 12,544,125 B2
(45) Date of Patent: Feb. 10, 2026

(54) DISPLAYING A TRANSITION ZONE BETWEEN HEART CHAMBERS

(71) Applicant: BIOSENSE WEBSTER (ISRAEL) LTD., Yokneam (IL)

(72) Inventors: Ofer Klemm, Koranit (IL); Inbal Dubiner, Kazir (IL); Natan Sharon Katz, Atlit (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 637 days.

(21) Appl. No.: 17/968,141

(22) Filed: Oct. 18, 2022

(65) Prior Publication Data
US 2024/0122639 A1 Apr. 18, 2024

(51) Int. Cl.
*A61B 5/367* (2021.01)
*A61B 5/346* (2021.01)
*A61B 18/14* (2006.01)
*A61B 18/00* (2006.01)

(52) U.S. Cl.
CPC .............. *A61B 18/14* (2013.01); *A61B 5/346* (2021.01); *A61B 5/367* (2021.01); *A61B 2018/00351* (2013.01); *A61B 2018/00577* (2013.01); *A61B 2018/00839* (2013.01)

(58) Field of Classification Search
CPC ......... A61B 18/14; A61B 5/346; A61B 5/367; A61B 2018/00351; A61B 2018/00577
See application file for complete search history.

(56) References Cited

U.S. PATENT DOCUMENTS

| | | |
|---|---|---|
| 5,391,199 A | 2/1995 | Ben |
| 5,443,489 A | 8/1995 | Ben |
| 5,558,091 A | 9/1996 | Acker |
| 6,172,499 B1 | 1/2001 | Ashe |
| 6,239,724 B1 | 5/2001 | Doron |
| 6,332,089 B1 | 12/2001 | Acker |
| 6,484,118 B1 | 11/2002 | Govari |
| 6,618,612 B1 | 9/2003 | Acker |
| 6,690,963 B2 | 2/2004 | Ben |
| 6,788,967 B2 | 9/2004 | Ben |
| 6,892,091 B1 | 5/2005 | Ben |
| 7,536,218 B2 | 5/2009 | Govari |

(Continued)

OTHER PUBLICATIONS

Spies et al., "A quantitative comparison of the electrical and anatomical definition of the pulmonary vein ostium", Pace-Pacing Clinical Electrophysiology, vol. 40, 2017, pp. 1213-1217 (Year: 2017).*

(Continued)

*Primary Examiner* — Catherine M Voorhees
(74) *Attorney, Agent, or Firm* — Smith, Gambrell & Russell LLP

(57) ABSTRACT

A system, includes (i) a processor, which is configured to receive, in a zone between first and second regions of an organ of a patient, one or more signals, at least a signal among the signals includes first and second components indicative of an electrophysiological (EP) property of the organ, and based on a relation between the first and second components, the processor is configured to estimate a location of at least a transition zone between the first and second regions, and (ii) a display, configured to display at least the estimated transition zone over a map of the organ.

18 Claims, 2 Drawing Sheets

(56) References Cited

U.S. PATENT DOCUMENTS

| | | |
|---|---|---|
| 7,756,576 B2 | 7/2010 | Levin |
| 7,848,787 B2 * | 12/2010 | Osadchy .............. A61B 5/6885 |
| | | 600/550 |
| 7,869,865 B2 | 1/2011 | Govari |
| 8,456,182 B2 | 6/2013 | Bar-Tal |
| 2020/0107877 A1 * | 4/2020 | Koblish ................. A61B 5/287 |
| 2020/0345262 A1 | 11/2020 | Selkee et al. |
| 2022/0354566 A1 * | 11/2022 | Schwartz ............... A61B 34/25 |
| 2024/0122639 A1 * | 4/2024 | Klemm .................. A61B 5/346 |

OTHER PUBLICATIONS

Asirvatham et al., "Pulmonary vein-related maneuvers: Part I", Heart Rhythm Society, vol. 4, No. 4, 2007, pp. 538-544 (Year: 2007).*

International Search Report for Corresponding PCT Appln. No. PCT/IB2023/060408 dated Jan. 26, 2024.

Spies Florian et al: "A quantitative comparison of the electrical and anatomical definition of the pulmonary vein ostium", PACE—Pacing and Clinical Electrophysiology., vol. 40, No. 11, Oct. 6, 2017 (Oct. 6, 2017), pp. 1213-1217.

Perez-Castellano Net al: "Errors in pulmonary vein identification and ostia location in the absence of pulmonary vein imaging", Heart Rhythm, Elsevier, US, vol. 2, No. 10, Oct. 1, 2005 (Oct. 1, 2005), pp. 1082-1089.

Asirvatham et al: "Pulmonary vein-related maneuvers: Part I" Heart Rhythm, Elsevier, US, vol. 4, No. 4, Mar. 30, 2007 (Mar. 30, 2007), pp. 538-544.

Patel Nirav et al: "Discrimination ofLeft Atrial and Pulmonary Vein Potentials in Patients with Paroxysmal Atrial Fibrillation", Journal of Cardiovascular Electrophysiology., vol. 14, No. 7, Jul. 1, 2003 (Jul. 1, 2003), pp. 698-704.

\* cited by examiner

DISPLAYING A TRANSITION ZONE BETWEEN HEART CHAMBERS

FIELD OF THE DISCLOSURE

The present disclosure relates generally to medical devices, and particularly to methods and systems for improving the estimated location of a transition zone between heart chambers.

BACKGROUND OF THE DISCLOSURE

Various techniques for estimating a transition zone between chambers of a heart have been published. Accurate mapping of the transition zone is important for conducting various types of medical procedures, such as tissue ablation.

The present disclosure will be more fully understood from the following detailed description of the examples thereof, taken together with the drawings in which:

DETAILED DESCRIPTION OF EXAMPLES

Overview

Figure 1:
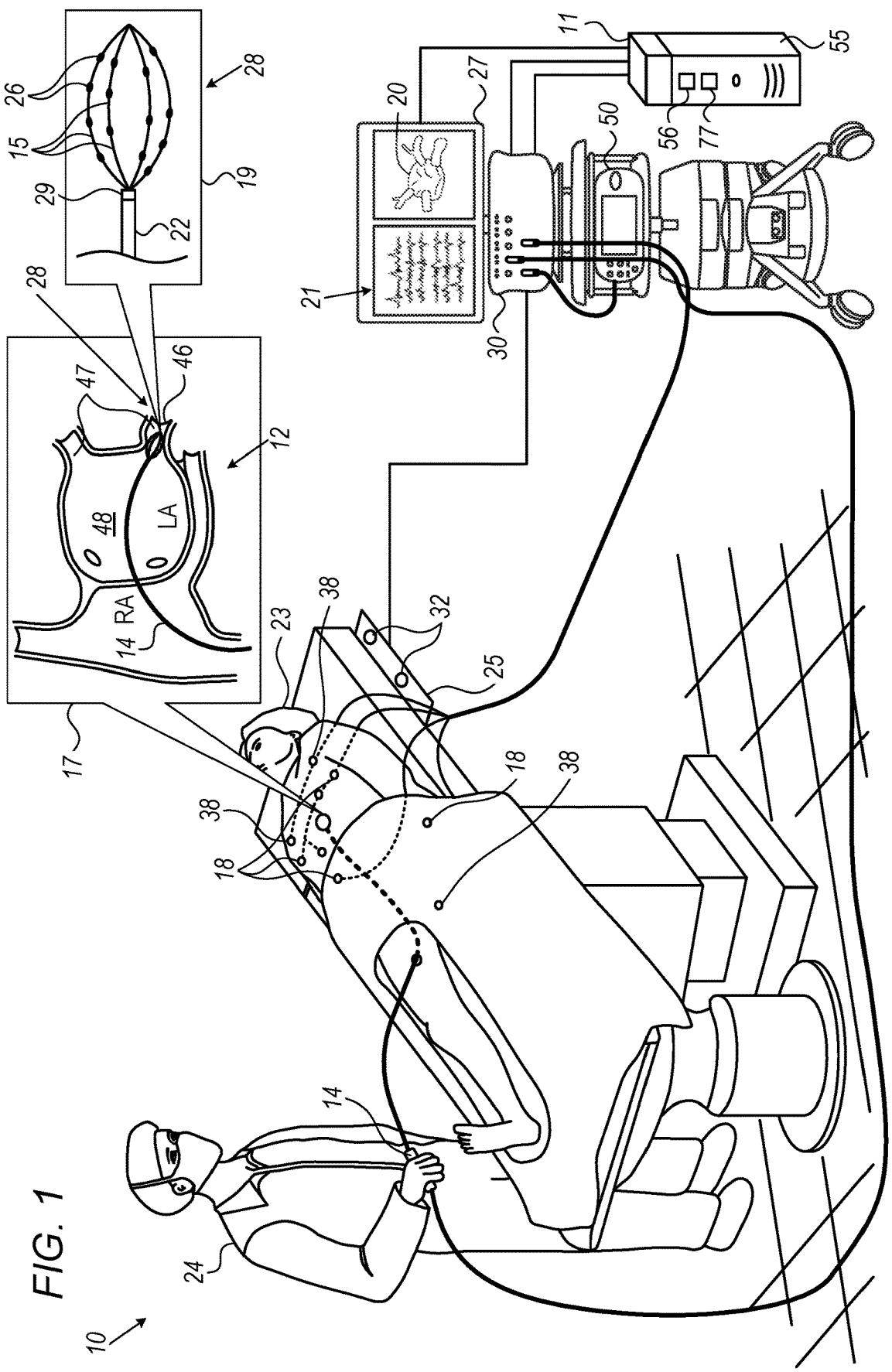
FIG. 1 is a schematic, pictorial illustration of a catheter-based electrophysiology mapping and ablation system, in accordance with an example of the present disclosure.

Some medical procedures require accurate mapping of the transition zone between regions of an organ. For example, in a pulmonary vein (PV) isolation procedure, ablation signals are applied to tissue at the ostium of a PV in order to transform the tissue to lesion, and thereby, reduce or eliminate arrhythmias, such as atrial fibrillation (AF) in the patient heart. The ablation is applied using one or more ablation electrodes of an ablation catheter, which are placed in contact with the tissue along an angular section at the transition zone. In case at least one of the ablation electrodes is not placed at the intended position, the lesion may not fully block the propagation of electrophysiological (EP) waves between the PV and the atrium, and therefore, will not eliminate the AF.

Examples of the present disclosure that are described below, provide techniques for improving the accuracy of estimating and displaying of the transition zone between two chambers of the patient heart.

In some examples, a system for treating arrhythmia in a patient heart comprises one or more catheters, at least one of the catheters has one or more ablation electrodes configured to apply radiofrequency (RF) energy to perform ablation of tissue of the patient heart. At least one of the catheters has one or more sensing electrodes that when placed in contact with the tissue, are configured to sense signals, such as electrical potential and/or impedance on the tissue in question.

In some examples, the system comprises a processor, which is configured to receive signals from one or more of the electrodes placed in contact with the tissue. The signals are indicative of an electrophysiological (EP) property of the heart, such as electrical potential. For example, when a sensing electrode is placed in contact with tissue at the transition zone between a PV and a left atrium of the heart, the signal indicative of the electrical potential of the tissue may comprise a first component indicative of the electrical potential at the left atrium, also referred to herein as left atrium potential (LAP), and a second component indicative of the electrical potential at the PV, also referred to herein as PV potential (PVP). When the sensing electrode is positioned closer to the atrium, the LAP has a larger amplitude, and when the sensing electrode is positioned closer to the PV, the PVP has a larger amplitude. Based on the relation between the LAP and the PVP, the processor is configured to estimate the location of the transition zone (e.g., the ostium) between the LA and the PV. In another example, the location of the LAP and PVP along a time axis indicative of a time interval of the signal, may be used for estimating the position of the transitions zone. The above examples and additional examples are described in detail in FIGS. 2 and 3 below.

In some examples, the system comprises a display device, also referred to herein as a display, for brevity, configured to display at least the estimated transition zone over an anatomical map of the heart.

The disclosed techniques improve the estimation and display of transition zones between chambers of the heart, as well as the transition zones between regions of other organs (having electro-anatomical signals) of a patient.

System Description

FIG. 1 is a schematic, pictorial illustration of a catheter-based electrophysiology mapping and ablation system 10, in accordance with an example of the present disclosure.

In some examples, system 10 includes multiple catheters, which are percutaneously inserted by a physician 24 through the patient's vascular system into a chamber or vascular structure of a heart 12. Typically, a delivery sheath catheter is inserted into the left or right atrium near a desired location in heart 12. Thereafter, one or more catheters can be inserted into the delivery sheath catheter so as to arrive at the desired location within heart 12. The plurality of catheters may include catheters dedicated for sensing Intracardiac Electrogram (IEGM) signals, catheters dedicated for ablating and/or catheters adapted to carry out both sensing and ablating. An example catheter 14 that is configured for sensing IEGM is illustrated herein.

Reference is now made to an inset 17 showing a sectional view of the atriums of heart 12. In some embodiments, physician 24 may place a distal tip 28 of catheter 14 in contact with the heart wall for sensing a target site in heart 12. Additionally, or alternatively, for ablation, physician 24 would similarly place a distal end of an ablation catheter in contact with a target site for ablating tissue intended to be ablated. In the present example, catheter 14 is inserted through the right atrium (RA) and punctured interatrial septum into a left atrium (LA) 48 of heart 12. As shown in inset 17, distal tip 28 is positioned at a transition zone, in the present example an ostium 47 of a pulmonary vein (PV) 46 located between LA 48 and PV 46. In the present example, PV 46 comprises the left inferior PV, but the procedure of sensing signal and applying ablation signals (as will be described below) is also applicable to the left superior PV, and to the right superior and right inferior PVs.

Reference is now made to an inset 19 showing distal tip 28. In some examples, catheter 14 includes one and preferably multiple electrodes 26 optionally distributed along splines 15 connected a shaft 22 at distal tip 28 of a basket catheter 14. Electrodes 26 and configured to sense the IEGM signals. Catheter 14 may additionally include a position sensor 29 embedded in or near distal tip 28 for tracking position and orientation of distal tip 28. Optionally and preferably, position sensor 29 is a magnetic based position sensor including three magnetic coils for sensing three-dimensional (3D) position and orientation.

Reference is now made back to the general view of FIG. 1. In some examples, magnetic based position sensor 29 may be operated together with a location pad 25 including a plurality of (e.g., three) magnetic coils 32 configured to generate a plurality of (e.g., three) magnetic fields in a predefined working volume. Real time position of distal tip 28 of catheter 14 may be tracked based on magnetic fields generated with location pad 25 and sensed by magnetic based position sensor 29. Details of the magnetic based position sensing technology are described, for example, in U.S. Pat. Nos. 5,5391,199; 5,443,489; 5,558,091; 6,172,499; 6,239,724; 6,332,089; 6,484,118; 6,618,612; 6,690,963; 6,788,967; 6,892,091.

In some examples, system 10 includes one or more electrode patches 38 positioned for skin contact on patient 23 to establish location reference for location pad 25 as well as impedance-based tracking of electrodes 26. For impedance-based tracking, electrical current is directed toward electrodes 26 and sensed at electrode skin patches 38 so that the location of each electrode can be triangulated via the electrode patches 38. This technique is also referred to herein as Advanced Current Location (ACL) and details of the impedance-based location tracking technology are described in U.S. Pat. Nos. 7,536,218; 7,756,576; 7,848,787; 7,869,865; and 8,456,182. In some examples, the magnetic based position sensing and the ACL may be applied concurrently, e.g., for improving the position sensing of one or more electrodes coupled to a shaft of a rigid catheter or to flexible arms or splines at the distal tip of another sort of catheter, such as basket catheter 14, and the PentaRay® or OPTRELL® catheters, available from Biosense Webster, Inc., 31A Technology Drive, Irvine, CA 92618.

In some examples, a recorder 11 displays electrograms 21 captured with body surface ECG electrodes 18 and intracardiac electrograms (IEGM) captured with electrodes 26 of catheter 14. Recorder 11 may include pacing capability for pacing the heart rhythm and/or may be electrically connected to a standalone pacer.

In some examples, system 10 may include an ablation energy generator 50 that is adapted to conduct ablative energy to one or more of electrodes at a distal tip of a catheter configured for ablating. Energy produced by ablation energy generator 50 may include, but is not limited to, radiofrequency (RF) energy or pulse trains of pulsed-field ablation (PFA) energy, including monopolar or bipolar high-voltage DC pulses as may be used to effect irreversible electroporation (IRE), or combinations thereof. In another example, catheter 14 may include one or more ablation electrodes (not shown), positioned at distal tip 28 and configured to apply the RF energy and/or the pulse trains of PFA energy to tissue of the wall of heart 12.

In some examples, patient interface unit (PIU) 30 is an interface configured to establish electrical communication between catheters, electrophysiological equipment, power supply and a workstation 55 for controlling the operation of system 10.

Electrophysiological equipment of system 10 may include for example, multiple catheters, location pad 25, body surface ECG electrodes 18, electrode patches 38, ablation energy generator 50, and recorder 11. Optionally and preferably, PIU 30 additionally includes processing capability for implementing real-time computations of location of the catheters and for performing ECG calculations.

In an example, one or more electrodes 26 are configured to receive electrical current from PIU 30, and impedance is measured between at least one electrode 26 and (i) a respective electrode patch 38, or (ii) a respective body surface ECG electrode 18.

In some examples, workstation 55 includes a storage device, a processor 77 with suitable random-access memory, or storage with appropriate operating software stored therein, an interface 56 configured to exchange signals of data (e.g., between processor 77 and another entity of system 10) and user interface capability. In an example, processor 77 is configured to produce a signal indicative of an electrophysiological (EP) property of heart 12. For example, (i) a first a signal indicative of electrical potential measured on the tissue in question having one or more electrodes 26 placed in contact therewith, and (ii) a second signal indicative of the measured impedance described above. Workstation 55 may provide multiple functions, optionally including (1) modeling the endocardial anatomy in three-dimensions (3D) and rendering the model or anatomical map 20 for display on a display device 27 (also referred to herein as a display, for brevity), (2) displaying on display device 27 activation sequences (or other data) compiled from recorded electrograms 21 in representative visual indicia or imagery superimposed on the rendered anatomical map 20, (3) displaying real-time location and orientation of multiple catheters within the heart chamber, and (4) displaying on display device 27 sites of interest such as places where ablation energy has been applied. One commercial product embodying elements of the system 10 is available as the CARTO™ 3 System, available from Biosense Webster, Inc., 31A Technology Drive, Irvine, CA 92618.

Figure 2:
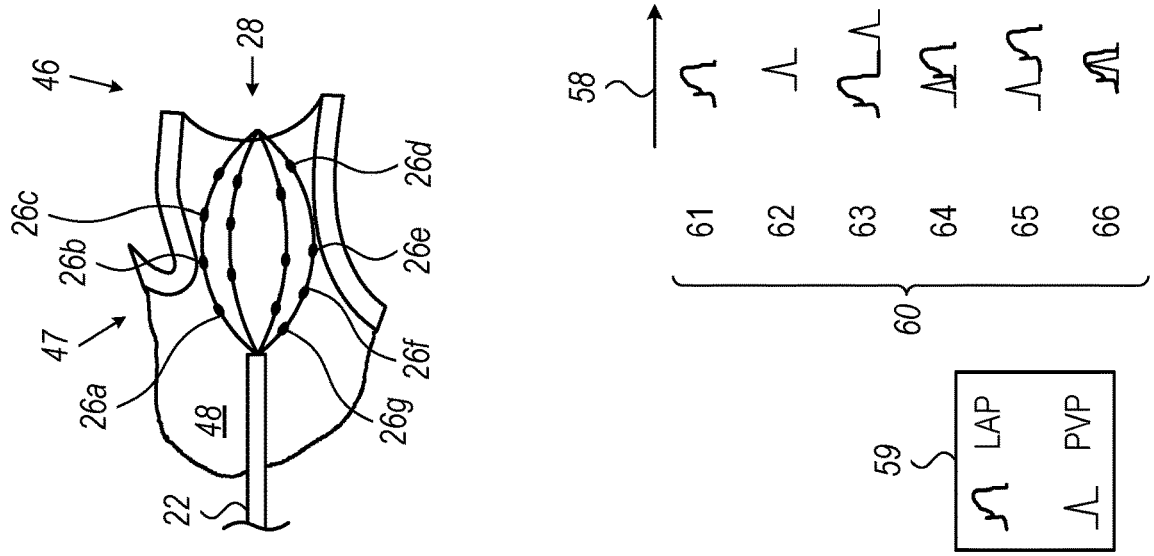
FIG. 2 is a schematic, pictorial illustration of a catheter placed between a left atrium and a pulmonary vein and signals produced by electrodes of the catheter, in accordance with an example of the present disclosure.

FIG. 2 is a schematic, pictorial illustration of electrodes 26 of distal tip 28 placed in contact with tissue of ostium 47 of PV 46 located between LA 48 and PV 46, and signals 60 received from electrodes 26, in accordance with an example of the present disclosure.

In some examples, distal tip 28 is positioned in ostium 47 and has some electrodes 26 placed in contact with tissue of ostium 47, LA 48 and PV 46. For example, electrodes 26a 26f and 26g are placed in contact with tissue of LA 48, electrodes 26c and 26d are placed in contact with tissue of PV 46, and electrodes 26b and 26e are placed in contact with tissue of ostium 47, also referred to herein as the transition zone between LA 48 and PV 46.

In some examples, processor 77 receives from electrodes 26 signals 60 indicative of an EP property of heart 12. In the present example, the EP property comprises the electrical potential measured on the tissue in contact with the respective electrode 26. Additionally, or alternatively, processor 77 may receive from electrodes 26 another signal indicative of the impedance measured between a selected electrode 26 and (i) a respective electrode patch 38, or (ii) a respective body surface ECG electrode 18.

In some examples, signals 60 comprise one or more components indicative of the position of electrode 26 and the type of signal. For example, when an electrode 26 is placed in contact with tissue at the transition zone (e.g., ostium 47) between PV 46 and LA 48, the signal indicative of the electrical potential of the tissue may comprise a first component indicative of the electrical potential sensed at LA 48, also referred to herein as left atrium potential (LAP), and a second component indicative of the electrical potential measured at PV 46, also referred to herein as PV potential (PVP). It is noted that the LAP and the PVP have their respective morphologies as shown in the legend 59. Moreover, the morphology of LAP and PVP may be altered, for example, with the sensed amplitude and proximity between the region in question (e.g., LA 48 and PV 46) and the position of the respective electrode 26 as will be described below.

A few non-limiting examples of signals 61, 62, 63, 64, 65 and 66 are showing the relation between LAP and PVP in signals received from electrodes 26. In signal 61 received from electrode 26g, which is positioned within LA 48, the LAP has a large amplitude (e.g., about 1 mv) and the amplitude of the PVP (e.g., about 0.16 mv) is below a predefined threshold, e.g., about 0.2 my (stored for example in processor 77), and therefore, does not appear in signal 61. In signal 62 received from electrode 26d positioned within PV 46, the PVP has a large amplitude (e.g., larger than about 0.5 mv), and the amplitude of the LAP is below another threshold (e.g., about 0.15 mv) stored in processor 77, and therefore, LAP does not appear in signal 62.

In signal 63 received from electrode 26a located closer to LA 48 than to PV 46, the amplitude of the LAP is larger than that of the PVP (e.g., 0.8 my LAP and 0.2 my PVP. Moreover, in the time interval of signal 63, (i) the LAP occupies a first sub-interval of the time interval of signal 63, and (ii) the PVP, which is sensed later than the LAP (because electrode 26a is closed to LA 48 than to PV 46), occupies a second (later) sub-interval of the time interval of signal 63. In the example of signal 63, the relation between the first and second components (e.g., LAP and PVP) comprises: (i) a calculated difference in the amplitude size between the LAP and the PVP (and/or the calculated ratio between the voltage of the amplitudes of the LAP and PVP), and (ii) a calculated time duration between the first position of the LAP and the second (later) position of the PVP along a time axis 58 of signals 60. In other words, because electrode 26a is positioned closer to LA 48 than to PV 46, the LAP appears before the PVP and has a larger amplitude compared to the amplitude of the PVP. Moreover, the width of the LAP and PVP signals along time axis 58 may differ from one another as shown in FIG. 2.

In signal 64 received from electrode 26b located at ostium 47 but slightly closer to PV 46 than to LA 48, the amplitudes of the LAP and the PVP are approximately equal. Moreover, in the time interval of signal 64, the PVP appears slightly before the LAP because electrode 26b is located slightly closer to PV 46 than to LA 48. It is note that the sub-interval in which the LAP and PVP appear in the signal, is also affected by the direction of the EP wave propagating between PV 46 and LA 48. For example, in case the EP wave propagates from PV 46 toward LA 48, the PVP may appear before the LAP along time axis 58, and yet, the position of the PVP and LAP is also affected by the position of the respective electrode 26.

In the example of signal 65, which is the potential measured between electrodes 26d and 26g, the EP wave propagates from PV 46 toward LA 48, and therefore, PVP appears before LAP and the amplitudes of the PVP and LAP are approximately equal.

In the example of signal 66, which is the potential measured between electrodes 26e and 26b located approximately at the transition zone (e.g., ostium 47), the LAP and the PVP sensed by each of electrodes 26e and 26b almost overlay one another, and the amplitudes are equal.

In some examples, based on the relation between the LAP and the PVP of signals 61-66, processor 77 is configured to estimate the location of the transition zone (e.g., ostium 47) between LA 48 and PV 46. In such embodiments, processor 77 is configured to estimate that electrodes 26b and 26e and positioned approximately at ostium 47, whereas electrodes 26a, 26f and 26g are positioned closer to LA 48, and electrodes 26c and 26d are positioned closer to PV 46. Based on the position sensing described above (using magnetic based position sensor 29 and the ACL described in FIG. 1 above), processor 77 is configured to estimate the positions of ostium 47 and of PV 46 and LA 48.

In some examples, display device 27 is configured to receive the estimated positions from processor 77, and to display the estimated positions of ostium 47 and of PV 46 and LA 48 over the rendered anatomical map 20 described in FIG. 1 above. In such examples, physician 24 may use the displayed estimated position of ostium 47 for placing ablation electrodes along an angular section of ostium 47 for conducting a PV isolation procedure by applying ablation signals to the ablation electrodes placed along the angular section of ostium 47.

In some examples, processor 77 may control PIU 30 to flow current to one or more (e.g., all) electrodes 26. Subsequently, processor 77 receives from PIU 30 (e.g., from electrodes 26 or from generator 50) additional signals indicative of the impedance measured between each selected electrode 26 and a reference electrode, e.g., electrode patch 38, or body surface ECG electrode 18 described in FIG. 1 above. It is noted that typically, the impedance (which is the opposition to electrical flow) measured using a given electrode 26 located at PV 46 (e.g., electrode 26d), is higher compared to the impedance measured using an electrode 26 located at LA 48 (e.g., electrode 26g). In such examples, based on the measured impedance and the position of each electrode 26, processor 77 may estimate the position of PV 46, LA 48 and ostium 47, which is the transition zone between PV 46 and LA 48.

In a non-limiting example, in case the average measured impedance using electrode 26g (located within LA 48) is about 100 ohm, the average measured impedance using electrode 26d (located within PV 46) is about 120 ohm, and the average measured impedance using electrode 26b or 26e (located approximately at ostium 47) is about 110 ohm. Note that the actual numbers of the measured impedance depend on: (i) many elements of the electrical circuit comprising electrode 26, the reference electrode, and the hardware used for flowing the current and measuring the impedance, (ii) the physiological and electrophysiological properties of the tissue in question, and other electrical and/or electronic entities located in proximity with the electrical circuit described above. Thus, processor 77 may use the calculated difference in the impedance measured using electrodes placed in contact with the tissues of PV 46, ostium 47 and LA 48.

In some examples, processor 77 and/or physician 24, may use the relation between the LAP and the PVP as the primary source for estimating the accurate position of ostium 47, and the impedance data may be used as complementary information for estimating the positions of ostium 47, PV 46 and LA 48.

In some examples, the techniques described above may be used for estimating other transition zones in heart 12. For example, the techniques described above may be used for estimating the position of an atrioventricular valve (AVV) located between the LA 48 and the left ventricle (not shown) of heart 12, as well as for estimating the position of the AVV located between the right atrium and the right ventricle of heart 12. It is noted that in order to apply the disclosed technique, a catheter having sensing electrodes, such as electrodes 26 must be inserted into the respective atrium, ventricle and AVV, or using any other suitable number of catheters, each of which having electrodes configured to produce signals indicative of the potential and/or impedance measured at the respective locations of the atrium, ventricle and AVV.

Figure 3:
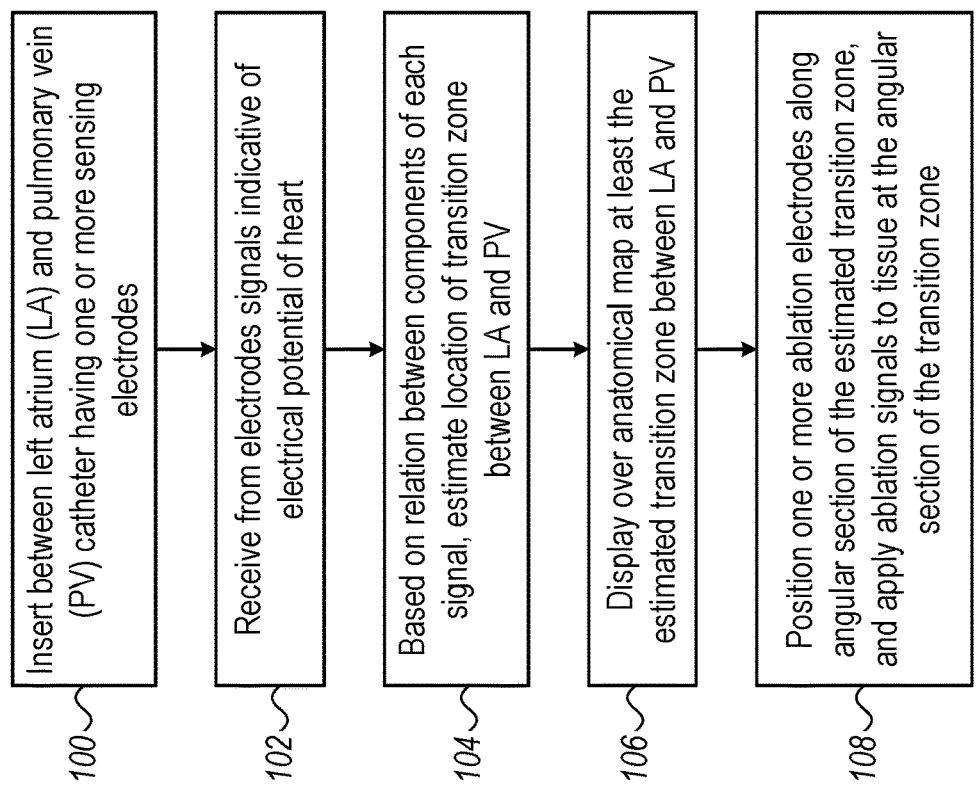
FIG. 3 is a flow chart that schematically illustrates a method for seamless switching between PFA-based and RF-based ablation modes, in accordance with an example of the present disclosure.

FIG. 3 is a flow chart that schematically illustrates a method for estimating and displaying the transition zone between PV 46 and LA 48, in accordance with an example of the present disclosure.

The method begins at a catheter insertion step 100, with physician 24 inserting distal tip 28 of catheter 14 between LA 48 and PV 46 of heart 12, as shown and described in detail in FIGS. 1 and 2 above. Note that electrodes 26 of distal tip 28 are placed in contact with tissue of heart 12.

At a signal receiving step 102, processor 77 receives from electrodes 26, signals 60 indicative of the electrical potential measured in PV 46, ostium 47, and LA 48. Moreover, processor 77 may also receive signals indicative of the impedance measured between each electrode 26 and a reference electrode, such as electrode patch 38, or a body surface ECG electrode 18 described in FIG. 1 above.

At a location estimation step 104, based on the relation between the LAP and the PVP of signals 60, processor 77 estimates the location of ostium 47, which is the transition zone between LA 48 and PV 46. Additionally, or alternatively, based on the one or more signals indicative of the measured impedance, processor 77 may also estimate the location of ostium 47. As described in FIG. 2 above, processor 77 can estimate the positions of ostium 47, LA 48 and PV 46 because the impedance in PV 46 is typically higher compared to the impedance in LA 48. In an example, processor 77 may use the relation between the LAP and PVP in each signal as the primary source for estimating the position of ostium 47, and may use the impedance data in order to verify or tune the accurate position of ostium 47.

At a display step 106 that concludes the estimating and displaying method, based on the estimated position of ostium 47, display device 27 is configured to display over anatomical map 20, the estimated positions of ostium 47, LA 48 and PV 46, as described in detail in FIG. 2 above.

In some examples, after concluding the estimating and displaying method at step 106, physician 24 may use the information displayed over anatomical map 20 for conducting a PV isolation procedure or any other suitable type of tissue ablation. For example, at a tissue ablation step 108, physician 24 may position ablation electrodes of catheter 14 or of another catheter (not shown) along an angular section of ostium 47, which is the estimated transition zone. Subsequently, processor 77 may control generator 50 to apply ablation signals to tissue at the angular section located at ostium 47.

Example 1

A system (20) including a processor (77) and a display (27). The processor (77) is configured to receive, in a zone between first and second regions (46, 48) of an organ (12) of a patient (23), one or more signals (60), at least a signal (61-66) among the signals (60) includes first and second components (LAP, PVP) indicative of an electrophysiological (EP) property of the organ (12), and based on a relation between the first and second components (LAP, PVP), the processor (77) is configured to estimate a location of at least a transition zone (47) between the first and second regions (46, 48). The display (27) is configured to display at least the estimated transition zone (47) over a map (20) of the organ (12).

Example 2

The system according to Example 1, wherein the first component has a first amplitude, and the second component has a second amplitude, and wherein the relation between the first and second components includes a ratio between the first and second amplitudes.

Example 3

The system according to Example 1, wherein the first component occupies a first sub-interval of a time interval of the signal, and the second component occupies a second sub-interval of the time interval, and wherein the relation between the first and second components includes a time duration between a first position of the first sub-interval and a second position of the second sub-interval.

Example 4

The system according to any of Examples 1-3, wherein the signal includes electrical potential measured by one or more electrodes placed in contact with tissue of the organ at one or more of: (i) the transition zone, (ii) the first region, and (iii) the second region.

Example 5

The system according to any of Examples 1-3, wherein the signal includes an additional signal indicative of impedance measured between a reference electrode and an electrode placed in contact with tissue of the organ at the transition zone.

Example 6

The system according to any of Examples 1-3, wherein the organ includes a heart, the first region includes an atrium of the heart, the second region includes a pulmonary vein (PV) extended from the atrium, the transition zone includes ostium of the PV, and the first and second components are indicative of measurement of the first and second EP properties of the atrium and the PV, respectively, and wherein, based on a relation between the first and second components, the processor is configured to estimate the location of the ostium between the PV and the atrium.

Example 7

The system according to any of Examples 1-3, wherein the organ includes a heart, the first region includes a given atrium at a given side of the heart, the second region includes a given ventricle at the given side of the heart, which is connected to the given atrium via an atrioventricular valve (AVV), and the transition zone includes the AVV at the given side of the heart, and wherein, based on a relation between the first and second components, the processor is configured to estimate the location of the AVV between the given atrium and the given ventricle.

Example 8

The system according to any of Examples 1-3, wherein at least one of the signals includes: (i) the first component, which is associated with the first region, or (ii) the second component which is associated with the second region, and wherein, based on the component in the signal, the processor is configured to estimate an additional location of the first region or the second region.

Example 9

The system according to any of Examples 1-3, the system further includes a catheter inserted into the organ and having first and second electrodes configured to produce first and second signals, respectively, indicative of the EP property of the organ, and wherein, based on the first and second signals, the processor is configured to estimate at least one of: (i) the first region, (ii) the second region, and (iii) the transition zone.

Example 10

The system according to Example 9, wherein the catheter includes one or more pairs of electrodes, and wherein at least one of the first and second signals includes a bipolar signal measured between a given pair of the electrodes.

Example 11

A method for displaying a transition zone between first and second regions of an organ, the method includes receiving, in a zone between the first and second regions of the organ of a patient, one or more signals, at least a signal among the signals includes first and second components indicative of an electrophysiological (EP) property of the organ. Based on a relation between the first and second components, a location of the transition zone between the first and second regions is estimated. At least the estimated transition zone is displayed over a map of the organ.

Although the examples described herein mainly address electrophysiology procedures comprising sensing signals for estimating the position of an ostium of a PV of the left atrium. The methods and systems described herein can also be used in other applications, such as in estimating the transition zones between any chambers of patient heart, and between a heart chamber and a connected blood vessel.

Moreover, the disclosed techniques may be used for estimating, based on suitable electro-anatomical signals, the position of any region in any suitable organ of a patient.

It will be appreciated that the examples described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a processor, which is configured to receive, in a zone between first and second regions of an organ of a patient, one or more signals, at least a first signal among the signals comprises first and second components indicative of an electrophysiological (EP) property of the organ; and based on a relation between the first and second components, the processor is configured to estimate a location of at least a transition zone between the first and second regions;
a display, configured to display at least the estimated transition zone over a map of the organ; and
wherein the organ comprises a heart, the first region comprises a given atrium at a given side of the heart, the second region comprises a given ventricle at the given side of the heart, which is connected to the given atrium via an atrioventricular valve (AVV), and the transition zone comprises the AVV at the given side of the heart, and wherein, based on a relation between the first and second components, the processor is configured to estimate the location of the AVV between the given atrium and the given ventricle.

2. The system according to claim 1, wherein the first component has a first amplitude, and the second component has a second amplitude, and wherein the relation between the first and second components comprises a ratio between the first and second amplitudes.

3. The system according to claim 1, wherein the first component occupies a first sub-interval of a time interval of the signal, and the second component occupies a second sub-interval of the time interval, and wherein the relation between the first and second components comprises a time duration between a first position of the first sub-interval and a second position of the second sub-interval.

4. The system according to claim 1, wherein the first signal comprises electrical potential measured by one or more electrodes placed in contact with tissue of the organ at one or more of: (i) the transition zone, (ii) the first region, and (iii) the second region.

5. The system according to claim 1, wherein the first signal comprises an additional signal indicative of impedance measured between a reference electrode and an electrode placed in contact with tissue of the organ at the transition zone.

6. The system according to claim 1, wherein the organ comprises a heart, the first region comprises an atrium of the heart, the second region comprises a pulmonary vein (PV) extended from the atrium, the transition zone comprises ostium of the PV, and the first and second components are indicative of measurement of the first and second EP properties of the atrium and the PV, respectively, and wherein, based on a relation between the first and second components, the processor is configured to estimate the location of the ostium between the PV and the atrium.

7. The system according to claim 1, wherein at least the first signal of the signals comprises: (i) the first component, which is associated with the first region, or (ii) the second component which is associated with the second region, and wherein, based on the component in the first signal, the processor is configured to estimate an additional location of the first region or the second region.

8. The system according to claim 1, and comprising a catheter inserted into the organ and having first and second electrodes configured to produce first and second signals, respectively, indicative of the EP property of the organ, and wherein, based on the first and second signals, the processor is configured to estimate at least one of: (i) the first region, (ii) the second region, and (iii) the transition zone.

9. The system according to claim 8, wherein the catheter comprises one or more pairs of electrodes, and wherein at least one of the first and second signals comprises a bipolar signal measured between a given pair of the electrodes.

10. A method for displaying a transition zone between first and second regions of an organ, the method comprising:
receiving, in a zone between the first and second regions of the organ of a patient, one or more signals, at least a first signal among the signals comprises first and second components indicative of an electrophysiological (EP) property of the organ;
based on a relation between the first and second components, estimating a location of the transition zone between the first and second regions;
displaying at least the estimated transition zone over a map of the organ; and
wherein the organ comprises a heart, the first region comprises a given atrium at a given side of the heart, the second region comprises a given ventricle at the given side of the heart, which is connected to the given atrium via an atrioventricular valve (AVV), and the transition zone comprises the AVV at the given side of the heart, and wherein, estimating the location of the transition zone comprises, estimating the location of the AVV, between the given atrium and the given ventricle, based on a relation between the first and second components.

11. The method according to claim 10, wherein the first component has a first amplitude, and the second component has a second amplitude, and wherein estimating the location based on the relation between the first and second components comprises calculating a ratio between the first and second amplitudes.

12. The method according to claim 10, wherein the first component occupies a first sub-interval of a time interval of the signal, and the second component occupies a second sub-interval of the time interval, and wherein estimating the location based on the relation between the first and second components comprises calculating a time duration between a first position of the first sub-interval and a second position of the second sub-interval.

13. The method according to claim 10, wherein receiving the first signal comprises receiving electrical potential measured by one or more electrodes placed in contact with tissue of the organ at one or more of: (i) the transition zone, (ii) the first region, and (iii) the second region.

14. The method according to claim 10, wherein receiving the first signal comprises receiving an additional signal indicative of impedance measured between a reference electrode and an electrode placed in contact with tissue of the organ at the transition zone.

15. The method according to claim 10, wherein the organ comprises a heart, the first region comprises an atrium of the heart, the second region comprises a pulmonary vein (PV) extended from the atrium, the transition zone comprises ostium of the PV, and the first and second components are indicative of measurement of the first and second EP properties of the atrium and the PV, respectively, and wherein, estimating the location of the transition zone comprises, estimating the location of the ostium, between the PV and the atrium, based on the relation between the first and second components.

16. The method according to claim 10, wherein at least the first signal of the signals comprises: (i) the first component, which is associated with the first region, or (ii) the second component which is associated with the second region, and wherein, estimating the location of the transition zone comprises, estimating the location of an additional location of the first region or the second region based on the first component or the second component in the first signal.

17. The method according to claim 10, wherein receiving the one or more signals comprises receiving, from at least first and second electrodes of a catheter inserted into the organ for producing first and second signals, respectively, and wherein, estimating the location of the transition zone comprises, estimating, based on the first and second signals, at least one of: (i) the first region, (ii) the second region, and (iii) the transition zone.

18. The method according to claim 17, wherein receiving the signal comprises receiving a bipolar signal measured between a given pair of electrodes selected from the at least first and second electrodes.

* * * * *